Fig. 1.

Nov. 26, 1963    SAICHIRO OHASHI ETAL    3,111,888
MONOCULAR REFLEX CAMERA
Filed Aug. 2, 1960    8 Sheets-Sheet 2

SAICHIRO OHASHI ETAL 3,111,888

MONOCULAR REFLEX CAMERA

Filed Aug. 2, 1960

ced to correct the indication of meter needle. Thus, according to this invention, since the dial-graduation is

United States Patent Office 3,111,888
Patented Nov. 26, 1963

3,111,888
MONOCULAR REFLEX CAMERA
Saichiro Ohashi, Kita-ku, Kyoto-City, Koichi Aoki, Minoo-City, Osaka-fu, and Yoshio Nitta, Higashinari-ku, Osaka-City, Japan, assignors to Chiyoda Kogaku Seiko Kabushiki Kaisha, Osaka-City, Japan, a corporation of Japan
Filed Aug. 2, 1960, Ser. No. 46,933
Claims priority, application Japan Aug. 4, 1959
6 Claims. (Cl. 95—10)

The present invention relates to a monocular reflex camera, and particularly to a camera wherein an appropriate shutter value, i.e. adequate exposure, can be obtained by meters in accordance with the brightness of objects to be photographed under precontrolled shutter speed and film-sensitivity, or further, if necessary, which can be exchanged with a hand operating shutter.

The automatic shutter control for a conventional camera has not usually been without a defect of tending to be troublesome and causing damage to the camera structure, such as a pointer being bent or a shaft being bent or bearings being disengaged, etc. in a meter, which is a delicately constructed body. Damage occurs because an indicator needle of an exposure meter is directly pushed by a shutter actuating lever, or the actuating lever is quickly stopped by the indicator needle under spring action during the shutter operation; in other words, in this case, a moving body having a considerable amount of inertia is stopped by the meter indicator needle.

In contrast thereto, according to this invention, the meter needle is stopped on one hand and the shutter actuating rod is stopped on a stopping stairs opposite a smooth surface on the other by an actuating lever, which is provided between the exposure meter and shutter actuating lever. Since the camera is equipped with those provisions, said camera shows important advantages in that when said camera is directed toward the object to be photographed and a shutter button is pushed, an appropriate shutter adjustment as indicated by the exposure meter is automatically provided, and therefore, quick and errorless photographing can be conducted.

Moreover, referring to the camera according to the present invention, an automatic shutter mechanism, wherein an exposure meter which is pushed by an actuating lever coupled to a shutter button and an actuating bar, is adapted advantageously to easily effect special photographing technique, such as particularly providing a dim background of the picture by adjusting the depth of focussing or, on the contrary, providing a distinct background or performing a long or short time exposure by choosing a desirable shutter value by virtue of said hand-operating ring, independent of the stopping lever by automatically operating the electric circuit for the meter by actuation of a simple hand-operating ring.

On the other hand, generally there are numerous sorts of films for cameras of different light sensitivity, including films such as ordinary black and white films, "technicolor" films, etc. In the present invention, those sensitivities of films are incorporated with the predetermined dial graduation of the meter and control the light of incidence to the light receiving plate of photoelectric cell for compensation of sensitiveness, facilitating the adjustment of exposing conditions, such as the diaphragm aperture or shutter speed. In this case, a blind for changing the area or concentration of penetrating light of the light-penetrating portion from high to low continuously or stepwise is stretched in front of a light-receiving plate of a photo-electric cell, whereby the generated E.M.F. is controlled due to the change of the light amount reequidistant and the operation is translated linearly, and because a driving gear and shutter-actuating lever or velocity ring can be connected by a gear system, the adjustment in accordance with those shutter values and change of velocity can be done automatically and easily. Furthermore the photoelectric cell shows unstable E.M.F., when it is partly covered from one side of the light-receiving plate. According to the present invention, however, since the light-receiving plate is covered with blinding films equally from both sides, or the whole surface is equally reduced in its brightness by using an optical wedge, the central portion is stable, because of the portion being always in the condition for use.

In a monocular reflex camera as of the present invention, wherein no focal plane shutter is used, a picture-window is provided with a blinding plate which descends to close the picture window before the mirror is moved downward. For this reason, according to the present invention, a planet gear pivoted on a coaxial lever is interposed between a sector gear of the coaxial blinding plate and an inside sector gear a mirror seat, said lever being operated by a reciprocating lever on the film reeling side to actuate the vertical movement of blinding plate and mirror. It is possible to provide a monocular reflex camera capable of effecting a simple, quick and exact operation of said blinding plate and mirror.

On the other hand, in the well-known camera of a type in which the film-reeling operation is performed by a lever, the operational angle of the lever ranges generally from 180° to around 230°. For those having smaller operation angles, five gears are used in a sprocket gear system, the two gears of which are coaxial combinations; for those having larger operation angles, three gears are used in the sprocket gear system and the sprocket gear is revolved one revolution (360°). In the present invention, the film-reeling can be done simply in one unit operation, because the revolution is in the same direction and the lever operational angle is chosen as small, for instance, 120° to 180°, and the gear system is not complicated, by using an inner gear in said lever portion. Furthermore, in usual ones wherein a reeling lever is provided in the casing, the casing notches extend to the front face. In the present invention, the noches occur in an extremely narrow range. Moreover, as those clearances are always locked up with said reeling lever, it is very convenient to operate and has other advantages, for instance, the sprocket gear system may be simply three gears arranged on a plane.

According to the present invention, as the shutter blades and exposure blades are designed to commence to open on the way of shutter charging, the charging of the blind plate must be finished before said blades commence to open. Accordingly, in this meaning, in this invention, the shutter charge mechanism is adapted to conduct the film-reeling by a lever, the movement of said lever being directly transmitted to a set lever for the shutter. Either mechanism of the camera types referred to above or the well-known type wherein the charging is performed for substantially a whole course of reeling, one unit length of film can be used in combination advantageously. Since it is performed by gears cooperating in the film-reeling gear system, the operation is exact and firm. Furthermore, as the actuation plate and connecting rod, etc. can be fabricated by pressing, space can be economized, when the camera is contracted, and the cost is advantageously low due to its simple construction.

On the other hand, the shutter charging mechanism according to the present invention is effective to increase the stroke of a pin driven by a connecting rod and transmits it to another pin; and particularly since the locus of the other pin is flattened toward a circle when the pivotal fulcrum shifts the forked portion of said lever in accordance with the rocking motion of the lever, said lever may be short in order to economize the space occupied by the essential portions and simultaneously to effect shutter charge automatically in conjunction with the reeling of film; in addition the interlocking member of such a construction has another advantage in that it can be used for another object other than shutter charging.

In the following the present invention will be described in detail, with respect to all embodiments illustrated in the accompanying drawings; however, the present invention is not of course limited by the following description, and moreover, the present invention can be improved and altered without departing from the spirit of the invention as described in the claims of this invention; similar parts are shown by similar symbols throughout the drawings, in which

FIGS. 15 to 17 are respective positions of operation of the operational mechanism shown in FIG. 14.

Referring now to FIGS. 1, 2, and 3, 18 is an eye piece; 19 is an accessory clip; 27 is a pentaprism surrounded by a protecting frame 57; 58 is a condenser lens; and 59 shows a mirror box. The light-receiving plate 41 is provided with a front sheet 60 in front thereof as is well-known. Each of the objective lens group 87 is mounted on lens cylinder 88. Between those lens cylinders is interposed a helicoid 89, which is actuated by a helicoid actuating ring 90, and an auxiliary filling ring 116 is provided in said actuating ring. 117 represents a front sheet, in said front sheet is formed a hole 118 through which a knob 37 is protruded. 119 is a film pressing plate; 120 a back cover; 140 is an attaching leather for the back cover; 143 is a lower cover. 144 is the upper cover and 145 is a fitting frame for eye-piece 18, 146, (FIG. 3) is a film-reeling plate and 148 is a film reeling lever.

Figure 1:
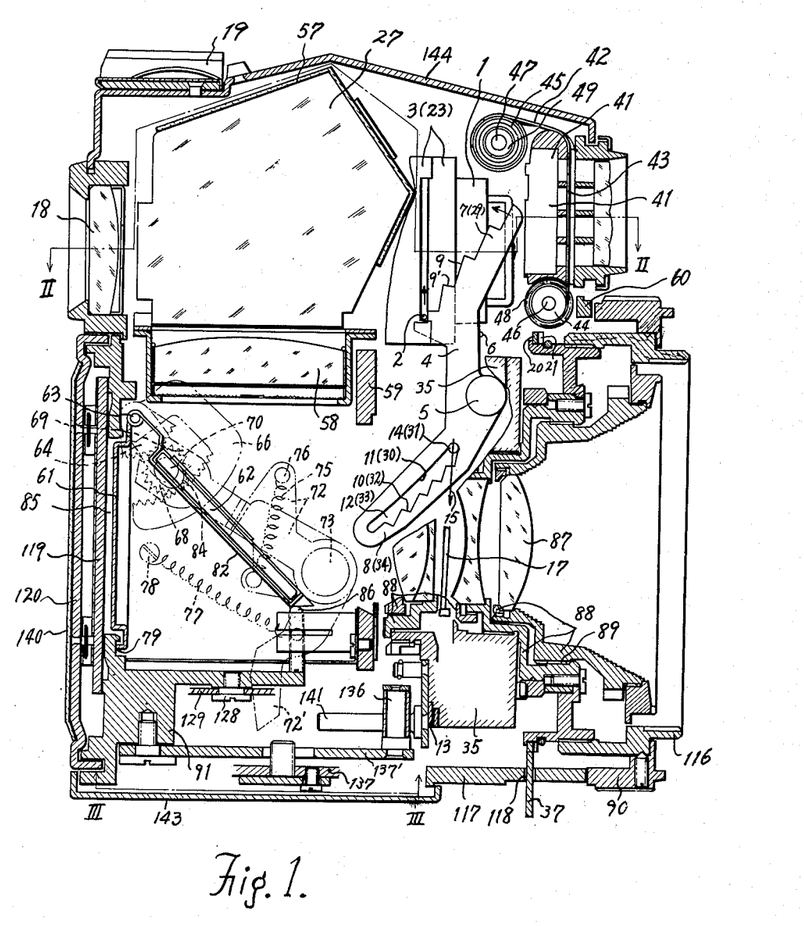
FIG. 1 is a longitudinal, sectional side view of the monocular reflex camera according to this invention.
Figure 2:
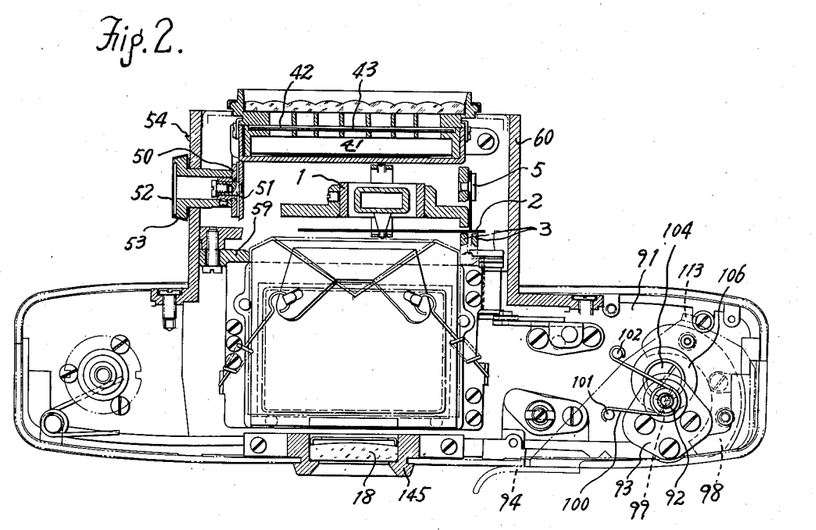
FIG. 2 is a view as seen in the arrow direction on line II—II of FIG. 1.
Figure 3:
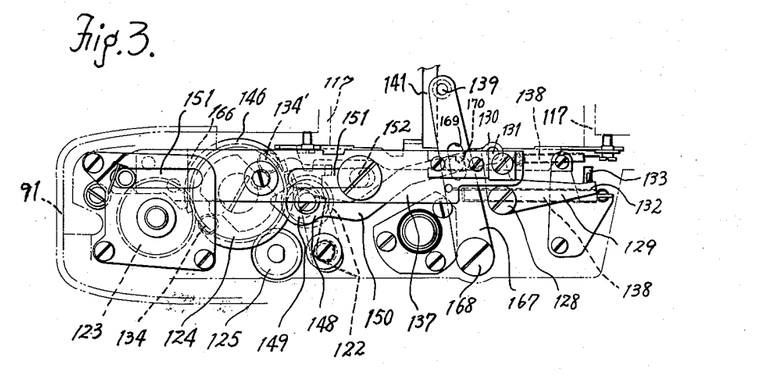
FIG. 3 is a view as seen in the arrow direction on line III—III of FIG. 1.

An automatic shutter mechanism for a monocular reflex camera according to this invention, as illustrated in FIGS. 1 to 3, is best viewed in FIGS. 4–8 wherein a supporting plate 3 is provided along a revolving plane 2′ of indicator needle 2 of electric exposure meter 1. An actuating rod 4 which moves in and out along end face 3′ of said supporting plate is pivotally held on a spindle 5 and, at the same time, tensioned clockwise with spring 6. The supporting plate 3 is formed into two sheets holding actuating rod 4 therebetween, or wires or rods, etc. may be used (see FIG. 9) instead of plates. The actuating lever 4 consists of a pushing rod 7 on the meter side and a stopping rod 8 on the shutter side. The actuating surface 9 of pushing rod 7 has a saw-tooth shaped stair 9′, and stopping rod 8 is formed with a long groove 12 consisting of a notched edge forming a stopping stair 10 and a smooth edge forming a sliding face 11 for guiding. The actuating rod 14 of iris ring 13 is pulled by spring 15 anticlockwise (the working direction of shutter blade 17). On one end of said shutter actuating rod pivotally carries a pin 16 which is moving on arc-shaped moving surface 11 in long groove 12.

Figure 4:
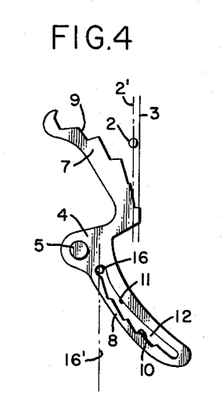
FIGS. 4 to 6 are operational views of automatic shutter mechanism for this camera.
Figure 5:
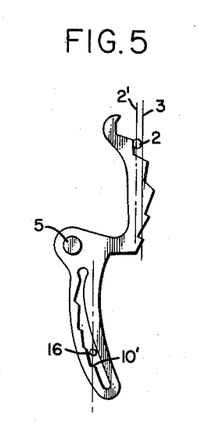
Figure 6:
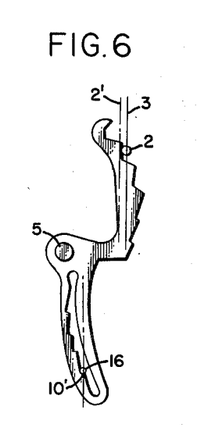
Figure 7:
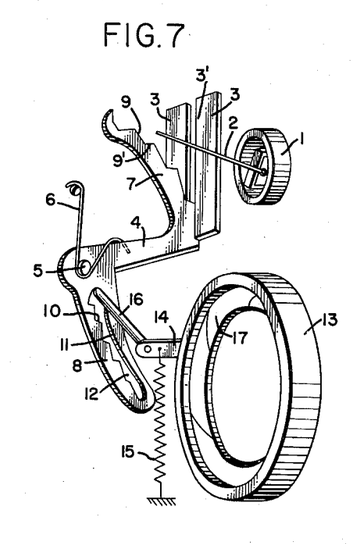
FIG. 7 is an oblique view of FIG. 4.

Thereupon, when shutter is charged, shutter actuating rod 14 revolves clockwise against spring 15 and the pin 16 rises while sliding on sliding surface 11 of long groove 12, and simultaneously the actuating rod 4 is rotated counterclockwise against spring 6 causing the pushing rod 7 to be separated from supporting plate 3. Thus, blades 17 are opened full when pin 16 reaches the upper end of long groove 12, the shutter is set and the related mechanism comprising actuating rod 4 and shutter actuating rod 14 etc. reaches the condition as shown in FIG. 4 and FIG. 7. In this case, the indicator needle 2 has a slight clearance between supporting plate 3 and itself, and can freely move on its moving surface according to the amount of light from the object to be photographed.

Figure 8:
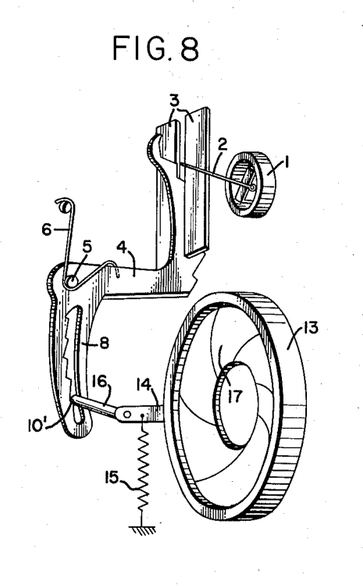
FIG. 8 is an oblique view of FIG. 5.

In the photographing, by pushing the shutter button, the shutter ring 13 is released from halting by interlocking action, and shutter actuating rod 14 is pulled downward by spring 15, resulting in shutter ring 13 being rotated anticlockwise whereby the shutter blades 17 are then shifted to reduce the aperture diameter. As the shutter ring 13 releases the pin 16, the actuating rod 4 rotates clockwise by its own spring 6 and the pin 16 moves downwardly by sliding in contact with the sliding surface 11 to the bottom of elongated groove 12, and the pushing rod 7 shifts in the direction of sinking toward end-face 3′ of supporting plate 3. Then, needle 2 indicating the exposure amount corresponding to the brightness of the object at that moment is positioned at an appropriate position; the actuating surface 9 first comes in contact with needle 2, then with the advance of pushing rod 7 moves together with the needle 2 to close a slight clearance and push the needle to supporting plate 3; as the subsequent advancing of pushing rod 7 is disturbed by needle 2, actuating rod 4 stops and takes the conditions shown in FIG. 5. The actuating rod 4 and the stopping rod 8 are simultaneously stopped, however, the pin 16 is still in free condition and proceeds with actuating rod 14. As stopping rod 8 stops, the pin 16 becomes naturally apart from sliding surface 11 and comes in contact with stopping stair 10′ at a point slightly ahead in its advancing path and stops as seen in FIG. 8. The shutter radius now corresponds to the brightness indicated by the meter. The actuating surface 9 need not necessarily be stair-shaped as at 9′ but, may be a curved face, and need only have enough friction to prevent needle 2 from being kicked off, when needle 2 is pushed. It is also possible to constitute the intermediate arm portion of actuating rod 4 from pushing rod 7 or stopping rod 8 in the form of folding stairs, and also it is possible to constitute the pushing actuating surface and the stopping surface in different elevations, for the purpose of contracting a camera body.

In the present embodiment, shutter blades 17 are shifted by spring 15 in the direction to decrease the diameter of aperture, which movement is stopped by stairs 10. It is of course possible to stop by said stairs the opening of shutter from the minimum shutter value, with the shutter direction being reversed.

In the present embodiment having the above-mentioned construction, the movement of shutter actuating rod 14 follows the shutter operation, since the impact strength due to the spring force and acceleration of returning spring 6 is halted by spindle 5 of actuating rod 4. The force acting directly on needle 2 of meter is only a momentum of a light actuating lever 4 being rotated by a weak spring. On the other hand, a force to push down stopping stairs 10 by pin 16 with regard to the distances to the rotating plane 2' and arc-shaped moving face 16', respectively, causes a pressing force on needle 2 by the actuating face 9 because the loci of needle 2 and pin 16, respectively, from the center of spindle 5 revolves actuating rod 4 clockwise. Such a force may be neglected depending on the shape of stairs chosen, because it is extremely slight in view of the proportion of distances from the center of spindle 5 reaching to loci of pin 16 and needle 2.

Figure 9:
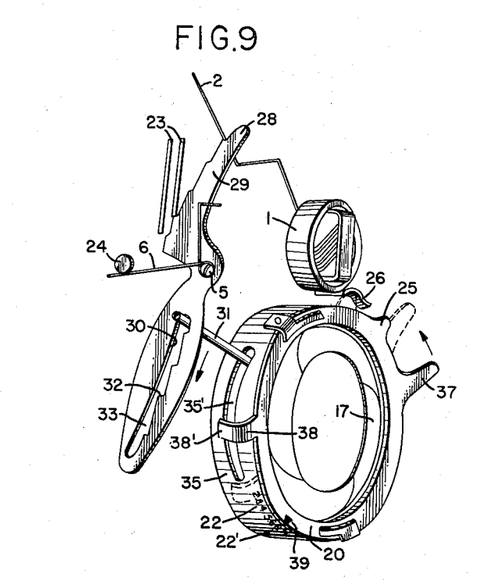
FIG. 9 is an oblique view of a hand operating shutter apparatus for the present camera having an automatic shutter mechanism, when the shutter is opened full by charging the diaphragm in cooperation with the shutter charging.
Figure 10:
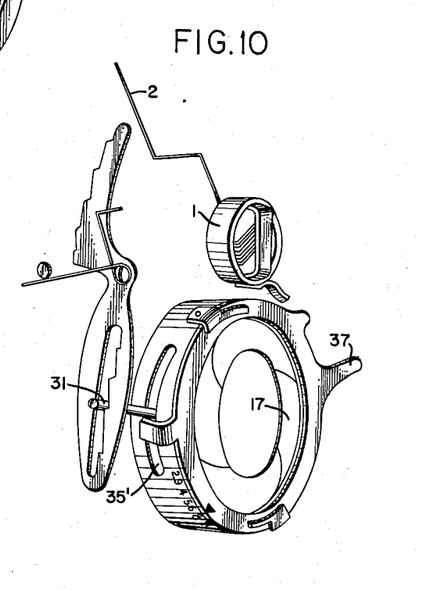
FIG. 10 is an oblique view of the diaphragm condition when the exposure is performed after the shutter button is pushed in FIG. 9.

FIGS. 9 and 10 show hand operating shutter means for automatic shutter camera (FIGS. 1 to 3) having automatic shutter mechanism illustrated in said FIGS. 4 to 8. A stopping rod 23 (i.e. stopping plate 3 in said embodiment of this invention) is provided on a plane adjacent and parallel to the actuating plane of needle 2 of electric exposure meter 1, and moves pivotally in a plane passing between said stopping rods, and actuating rod 4 is pivotally held on rotary shaft 5 on the side of camera body 91 (see FIGS. 1 to 3) in such a manner that needle 2 may be pushed toward said stopping rod. The actuating rod 4 is pressed counterclockwise under the spring force of spring 6 hung on a fixed pin 24, pushing rod 29 is arranged having pushing stairs 28 corresponding to shutter values for pressing said needle on the side of needle 2. A stopping rod 34 on the opposite side of the rotary spindle 5 is formed with an elongated slot 33 in which shutter actuating rod 31 can move freely; a sliding face 30 is formed on one side of the slot 33 and stairs 32 on the other side for engaging the actuating rod 31 in accordance with each shutter value.

A shutter ring (similar to the shutter ring 13 in FIG. 7) is enclosed within a ring casing 35 to operate the shutter blades 17 and is resiliently biased counterclockwise. The shutter ring actuating rod 31 is fixed to the shutter ring and protrudes through an elongated opening 35' in the ring casing 35 and thence through the elongated slot 33. A hand rotatable ring 20 is rotatable relative to the ring casing 35 by a projecting knob 37 and is frictionally attached to the ring casing 35 by leaf spring means 21. A radially projecting contact piece 25 on the hand ring 20 engages a contact piece 26 on the meter 1 for actuating the same. A projection 38 on the hand ring 20 has a folded tongue 38' which is disposed to engage the actuating rod 31. An indicia pointer 39 on the hand ring 20 cooperates with shutter values on the casing ring 35.

In photographing with the automatic shutter mechanism, the hand-operating ring 20 is rotated counterclockwise by the knob 37 to stop out of the moving range so that the folded tongue piece 38' may come to the dotted line position shown in FIG. 9, then contact pieces 25 and 26 contact each other and the meter circuit is closed to bring needle 2 to the working position. The spring of shutter actuating ring is energized (see FIG. 7) as associated with film-reeling and shutter charging operation, and the actuating rod 31 rises in the elongated slot 33, while the blades 17 are being opened, whereby the actuating rod 4 rotates clockwise against spring 6. When the rod 4 reaches the upper end of the elongated slot 33, the shutter ring is stopped by any suitable stopping mechanism and simultaneously the actuating rod 4 is stopped freely by the actuating rod 31.

The pressing stairs 28 of pushing rod 29, as this is separated from stopping rod 23, permit the meter needle 2 to move pivotally between the clearances. Accordingly when photographing is effected, the E.M.F. generated in the photoelectric cell (light receiving plate 41) enables said meter needle to pivot to an appropriate position. Thus, when the shutter button is pushed, first said shutter ring is first released and the shutter actuating lever 31, descending in the arrow direction in FIG. 9, begins to slide in the elongated slot 33 while shutter blades 17 are being closed; simultaneously the liberated actuating rod 4 is rotated clockwise by spring 6. The pushing stairs 28 of pushing rod 29 push needle 2 below the stairs, by revolution of actuating rod 4, and simultaneously said actuating rod stops. Hence, the actuating rod 31 having been sliding on the sliding surface 30 of the slot 33 separates from said sliding surface and is stopped on the stopping stairs 32 on its own path. Therefore, the shutter value corresponds to the appropriate value shown by meter 1. Then, an unillustrated and well-known repeated-striking mechanism operates shutter blades to perform exposure. In this case, as the impact by shutter actuating rod 31 is received by rotary spindle 5 through the stairs 32, no harmful effects are given on meter 1 as in the preceding embodiment.

In special types of photographing, if hand shutter operation is intended to be performed after the automatic shutter operation has been interrupted, the hand operating ring 20 is rotated clockwise by knob 37 against spring 21 from the dotted line position shown in FIG. 9, the contact pieces 25 and 26 are separated to open the meter-circuit and the needle 2 is displaced from the moving range of pushing rod 29. As shown in FIG. 9, the shutter indication 39 is set on the desired value 22' (for instance, 8) of the shutter graduation 22, the shutter is charged and shutter button is pushed; the shutter ring is first released and then actuating rod 31 commences to descend and simultaneously needle 2 and pushing rod 29 are separated from each other; the actuating rod 4 is pivoted counterclockwise by spring 6 and as the actuating rod 31 slides continuously on the side of sliding surface 30 of the slot 33 since it is not stopped on the stopping stairs 32. However, the actuating rod 31 is stopped by the folded tongue piece 38' of hand operating ring 20, which is positioned to correspond to the desired shutter value 22' (for instance, the shutter value is 8) as shown in FIG. 9.

Figure 11:
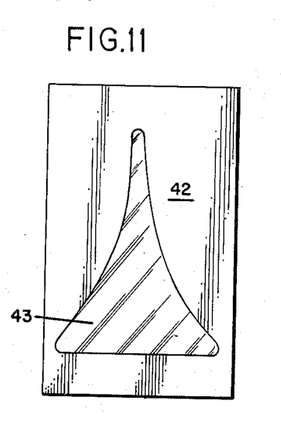
FIG. 11 is a development of a blind serving to explain the light of incidence controlling means for a light receiving light for the exposure meter in this camera.
Figure 12:
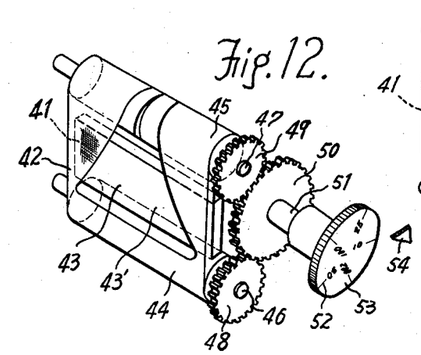
FIG. 12 is an oblique view illustrating an embodiment of said apparatus.
Figure 13:
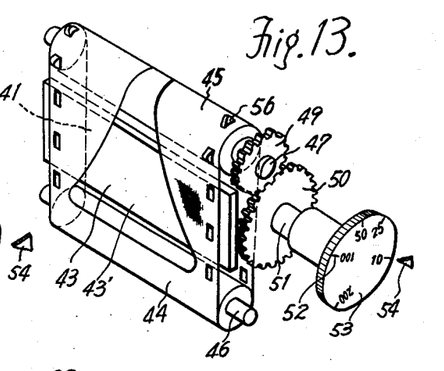
FIG. 13 is an oblique view illustrating another embodiment of the apparatus shown in FIG. 12.

FIGS. 11 to 13 illustrate an apparatus for controlling the incident light amount to a light receiving plate to be contracted into the monocular reflex camera according to this invention as illustrated in FIGS. 1 to 3. In FIG. 12, a blinding film 42 covering the front surface of light-receiving plate 41 (photoelectric cell) as well as movable drums 44 and 45 provides respective light receiving face corresponding to each sensitivity. Hence, as illustrated in FIG. 11, a symmetrical transparent portion 43 is provided, and both ends of both said movable drums are secured and an excess slackness is wound around one drum, for instance, drum 45 to stretch the working surface. In addition, two gears 48 and 49 both of same tooth number are respectively mounted on rotary shafts 46 and 47 of the drums rr and 45 and to mesh with a driving gear 51, whereby film-sensitivity graduation (ASA scale) 52, which is engraved on a dial body or knob 53 secured to the spindle 51 of said driving gear, cooperates with fixed indication 54.

Thereupon, when knob 53 is operated to set the desired sensitivity graduation 52, for instance, on fixed indication 54, both gears 48 and 49, and consequently drums 44 and 45, are simultaneously revolved equal distances in the same direction. The stretched blinding film 42 is shifted extremely smoothly, and the front face of light-receiving plate 41 is covered with transparent portion 43' having predetermined area. Consequently an E.M.F. corresponding to the amount of light passing through portion $re'$ is greater in said light-receiving plate 41 (photoelectric cell), with the result that meter needle 2 is allowed to shift according to compensating value. In this case, a blind film 42 may be of the optical light wedge, in which the penetrating degree varies continuously, excepting those illustrated in FIG. 11.

FIG. 13 illustrates an improved type of said embodiment shown in FIG. 12. Drum 45 is provided with sprocket 56; driven gears are limited to a single gear 49 on the drum side; blind film 42 is provided with perforated edges and its ends are adhered together to an endless member, which is passed over drums 44 and 45 with the perforated edges being caused to mesh with sprocket teeth 56. The gear 49 of drum 45 is revolved by the driving gear 50 causing the sprocket teeth 56 to accurately move the blind film 42 with the same accuracy as the previous embodiment (FIG. 12) whereby the light-receiving plate 41 is covered with transparent portion 43' of predetermined area and the corrected value is shown by meter needle.

FIGS. 14 to 17 illustrate an actuating mechanism for mirror and blind plates which are contracted in the monocular reflex camera shown in FIGS. 1 to 3 according to the present invention. A spindle 63 is provided on the side of camera body, coaxially on said spindle 63 are secured blind plate 61, mirror 62 carried by a mirror seating plate 82, sector gear 64, a loose fitting inside sector gear 66 and a lever 69. The gear 64 and folded tongue piece 81 on the side of said blind plate are connected together with rivet 65 and the inner sector gear 66 and tongue piece 83 of mirror seating plate 82 are connected with rivet 67. A planet gear 68 engaging with sector gear 64 and inner sector gear 66 respectively is pivoted to lever 69 by means of a spindle 70. A pin 70 also on lever 69, is slidably held by the bifurcated member 84 of lever 72 which is pivotally held on the body side by spindle 73. The other end 72' of said lever 72 is placed in the operational locus of reciprocal lever 74 on the side of reeling mechanism side of camera.

Figure 14:
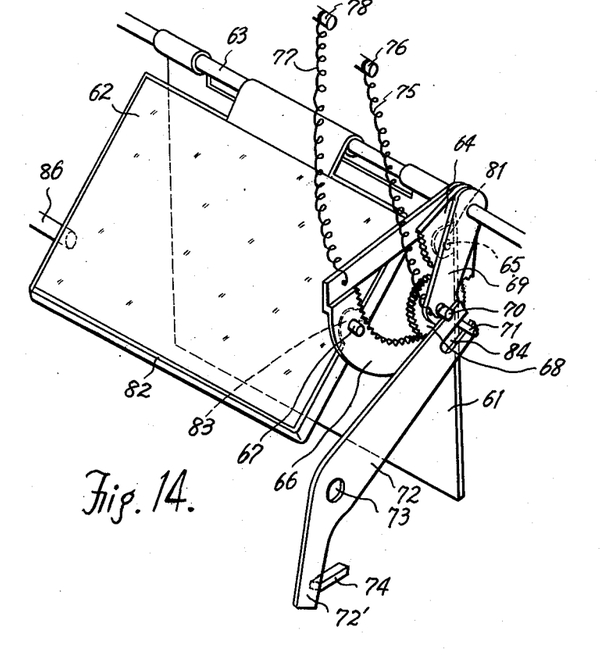
FIG. 14 is an oblique view of the camera illustrating the operational mechanism of a mirror and a blind.

The lever 69 is energized clockwise by spring 75 of which one end is secured to stationary pin 76 on the body side, and similarly is energized clockwise by pin 78 and spring 77.

Figure 15:
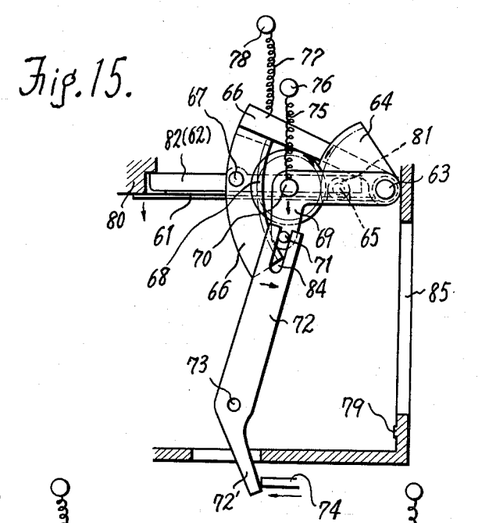
FIG. 15 illustrates the condition directly after the shutter cut off.
Figure 16:
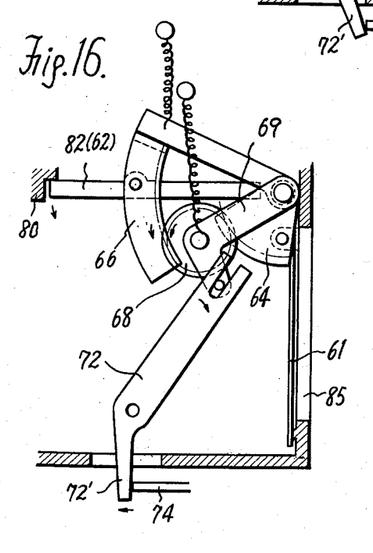
FIG. 16 illustrates the condition when the blind decends at the beginning of shutter charging.
Figure 17:
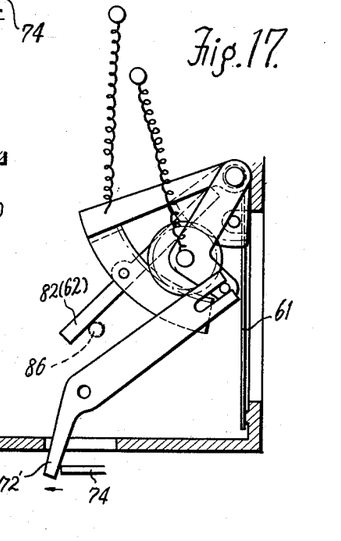
FIG. 17 is a side view illustrating a state in which it is ready for focusing after the shutter charging has been completed and the mirror has been descended.

Referring to the film-reeling for camera, when reciprocating rod 74 proceeds in the direction of arrow in FIG. 15, lever 72 moves pivotally clockwise and lever 69 is moved counterclockwise by bifurcated portion 84 of said lever 72 and pin 71. Since the gear sector 66 is pulled upward by spring 77 it does not move but the planet gear 68 itself which is meshing with inside sector gear 66, rotates clockwise and advances with lever 69, and the other engaging sector gear 64 is rotated counterclockwise. Accordingly, said planet gear causes blind plate 61 to move and descend through rivet 65 and tongue piece 81. As illustrated in FIG. 16, blind plate 61 strikes on stopper 79, thus closing the picture window 85 and as the rod 74 continues its movement, the sector gear 64 does not move, the planet gear 68 begins to rotate counterclockwise to descend the inner sector gear 66 against spring 67. Thus the mirror 62 and seating plate 82 descend with rivet 65 until it strikes on stopper 86 and stops, which is the condition directly before photographing (FIG. 14).

When reciprocating rod 74 retreats to the right by releasing operation for photographing (not illustrated), both the inner sector gear 66 and lever 69 commence to rotate clockwise by the action of springs 75 and 77 until the mirror seating plate 82 first strikes on the main body stopper 80 and stops. The planet gear 68 of lever 69 being pulled by spring 75 revolves while rotating counterclockwise. Therefore, the sector gear 64 meshing therewith is rotated clockwise and lifting blind plate 61 through rivet 15.

In this embodiment, as described before, the blind plate 61 is a kind of differential gear of light weight and a large range of revolution and has a fulcrum of revolution at spindle 63 and the forcing point on the pitch circle of sector gear 64. Mirror 62 which is heavy and whose rotating range is half of the plate 61 has a fulcrum of revolution at the same spindle 63 and the forcing point is farther than the plate 61 and on the pitch circle of inner sector gear 66, which is larger by the diameter of planet gear 68 as compared with the pitch circle of the sector gear 64. Therefore, the blind plate 61 being light and having a large actuating angle moves first and the mirror 62 heavy and of small actuating angle moves slower after the plate 61 stops. Accordingly, the force of reciprocating rod 74 is used uniformly and smooth operation is enabled.

Figure 18:
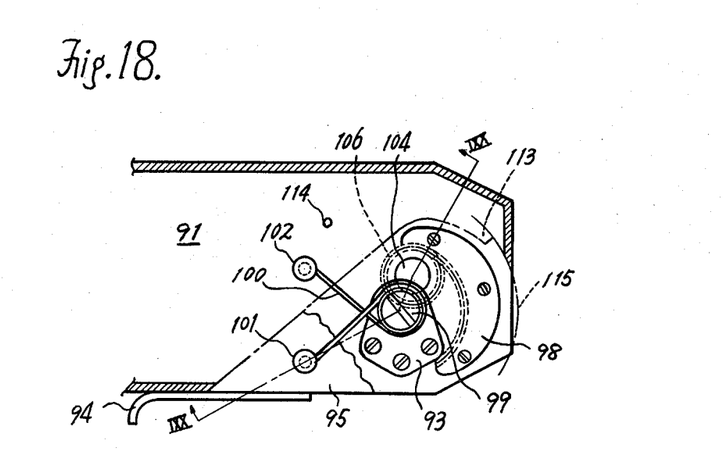
FIG. 18 is a plan view showing the inner construction of the film-reeling mechanism of this camera, with a partial notch.
Figures 19, 20:
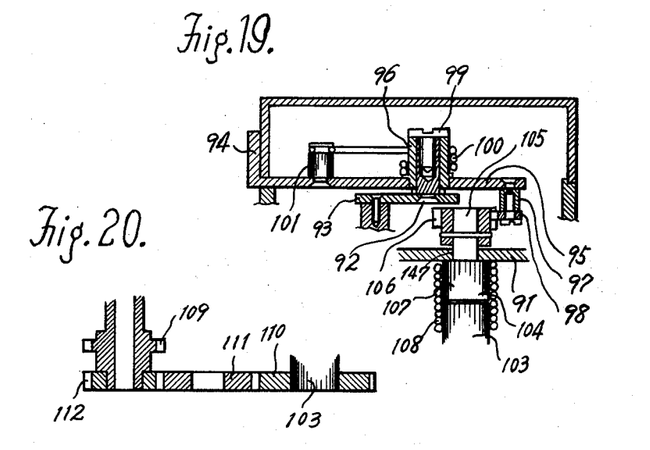
FIG. 19 is a sectional view along line IXX—IXX of FIG. 18.
FIG. 20 is a sectional view of the related portion, i.e. sprocket driving gear system, of the mechanism shown in FIG. 19.

FIGS. 18 to 20 show a film-reeling mechanism to be contracted in the monocular reflex camera according to this invention as illustrated in FIGS. 1 to 3. A retaining plate 93 fixed for unitary rotation with rotary spindle 92 is secured to camera body 91. A film-reeling lever 95 has an outer finger notch 94 and an inner end post 97 carrying a gear 98. Intermidate its ends, the lever 95 is attached to a bearing 96 which is inserted in rotary shaft 92 and keyed with screw 99. A coil portion of return spring 100 encircles the bearing 96 and its end portions are arranged between pin 101 and pin 102 which are respectfully fixed on the upper portion of reeling lever 95 and one the side wall of camera body 91 whereby the reeling lever 95 is energized clockwise. Spool axle 103 and coaxial transmission shaft 104 have a neck portion 105 extending through the body bearing 147, the upper end being secured with gear 106 which engages the inner gear 98. A kick spring 108 is wound around thick spindle portion 107 and the lower spool spindle 103 whereby the spring is partly loaded on spool spindle 103, which transmits rotation only when film is reeled counterclockwise by reeling lever 95, and which is arranged to rotate with unloaded rotation. Spool spindle 103 is provided with a well-known unillustrated film-reeling spool, and has a gear 110 for rotating sprocket 109 through 360° the gears being adapted to be interlocked with intermediate gear 110 is connected to an intermediate gear 111 which meshes with the gear 112 to drive the sprocket 109.

In order to reel films, as in ordinary process, finger notch 94 is forced counterclockwise by finger movement against return spring 100, then as reeling lever 95 rotates about rotary spindle 92 with inner gear 98, the transmission spindle 104 rotates in the same direction with increased speed by gear 106 meshing therewith causing rotation of the spool spindle 103 through kick spring 108; consequently, the sprocket 109 is rotated through gear series, 110, 111 and 112 to make one rotation (360°) according to the predetermined revolution ratio to reel one unit length of film, and simultaneously when one unit length of film is reeled by said sprocket, the stopping portion 113 of reeling lever 95 hits on the stopper 114 stopping further revolution. When a finger leaves the notch, the reeling lever 95 is returned to the original position by the spring force of return spring 100, and with the accompanying rotation of the transmission spindle 104 the one-way kick spring 108 does not act so that the gears dependent upon the spool 103 stand still. The rotary-contact system between the transmission spindle 104 and spool spindle 103 involves not only said kick spring, but also ratchet type or clutch type, that is, those which transmit in one direction and perform unloaded revolution in the other direction.

Thus, in the present embodiment, the rotation direction of reeling lever 95 is the same as the revolving direction of gear 106 meshing with inner gear 98. Since the axial distance of both gears is the difference in diameters of the two, one may freely select the position of rotary spindle 92, and the operation range of reeling lever 95 may be shifted to one side with respect to camera body 91 by appropriately locating the rotary spindle 92. Therefore, it is very advantageous from the point of design. In addition, in the camera of the type wherein a reeling lever is arranged in the casing of camera, the notches in the casing for the operation of reeling lever itself can be remarkably small as illustrated with chain line in FIG. 18.

Figure 21:
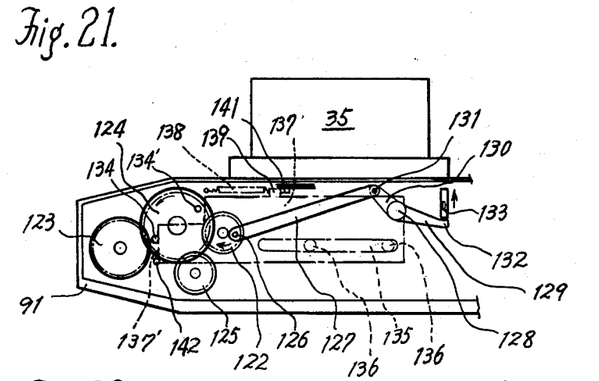
FIG. 21 is a plan illustrating the charging mechanism for the blind plate for the present camera.

FIG. 21 illustrates a charging mechanism for the blind plate, which is contracted in the monocular reflex camera according to the present invention as shown in FIGS. 1 to 3. A crank pin 126 is fixed to the gear 122 meshing with the gear system for reeling films, i.e., gears 123, 124 and 125 etc. A connecting rod 127 connects pin 131 planted on the rear portion 130 of rocking lever 129 which is pivoted on the camera body 91 by spindle 128 on the crank pin 126. An eccentric ring 148 (see FIG. 3) is planted on gear 122 instead of crank pin 126. A hole 149 engaging therewith (see FIG. 3) may be provided on the side of connecting rod 127. The charging lever 133 of blind plate (and mirror) 61 and (62) is projected through an unillustrated hole of body 91 and since it is located in the operational range of head portion 132 of rocking lever 129, the charging of said blind plate (and a mirror) is effected by moving same in the direction of arrow.

The mechanism for charging the shutter effects charge for substantially the whole interval of reeling one unit length of film. As illustrated in FIG. 21, a well-known type includes pins 134 and 134' provided at diametrically opposite points of gear 124 among the film-reeling gear series. The gear 124 revolves a half rotation per reeling a unit length of film, and an actuating plate 137 being reciprocated in one direction by guide groove 135 and two guide pins 136 inserted in said guide groove and planted by the body 91 is always energized by spring 138 to the left advancing direction, the end portion 137' of said actuating plate is arranged in opposition to pin 144 (or 144') and a projection 139 of said actuating plate is allowed to contact with a setbar pin 141 of shutter 35.

Now, when gear 124 is revolved in the direction of arrow by film-reeling operation, pin 134 proceeds to the right against spring 138 while the actuating plate 137 is pushed, and simultaneously the set bar pin 141 of shutter 35 is also made to advance to the right with projection 139. Directly after the pin 134 has reached the dead point on the right hand side, actuating plate 137 is separated from said pin 134 and pulled by spring 138 to advance to the left and hits the stopper 142 and stops returning thus to the original position. Pin 134 then comes to the position exchanged with symmetrical point pin 134' and stops. In the next place, actuating plate 137 is pushed to advance with said pin 134.

Such operational steps will now be described in detail: The crank pin 126 of gear 122 meshing with gear 124 reaches to the left hand side dead point, before pin 134 arrives at the right hand side dead point. In an intermediate point between said two dead points, as connecting rod 127 is pulled to the left by said crank pin, rocking lever 129 is pivoted counterclockwise and charging lever 133 projecting through unillustrated hole of body 91 is pushed to the direction of arrow by head portion 132 to complete charging of blind plate, mirror 61 and (62) (see FIGS. 14 and 15), where, however, shutter blades and exposure blades have not yet reached to a state of commencing to open. Gears 124 and pin 134 revolve further and rocking lever 129 begins to return to the original position and simultaneously the shutter blades and exposure blades of shutter 35 commence to open, and actuating plate 137 finishes its rightward movement; when the shutter and exposure blades of shutter 35 are opened by set lever pin 141 having advanced to the right pushed and accompanied by projection 139 to complete shutter-charging and the end portion 137' of actuating plate 137 is separated from pin 134, and as described above, advanced to the left by pulling by spring 138 to the original position, striking on stopper 144 and stops. At the same time, pin 134' comes to a position opposite said end portion 137'. Crank pin 126 is not necessarily set to the starting point at the right side dead point, that is, if the starting point is placed a little nearer to the left dead point, the charging of said blind plate (and a mirror) can be finished by that extent, and the meshing of gear 124 with gear 122 being controlled to enable the control of the timing for said blind plate.

Furthermore, as improved type of said embodiment, a connecting rod 150 of the shape illustrated in FIG. 3 is used; two short guide grooves 151 are provided instead of guide grooves connected in a long groove, and pin 152 is inserted in the other guide groove and may be used for guide and stopper. Moreover, a reel-stopping actuating lever 165 is provided as illustrated instead of said rocking lever 129 to constitute the end portion 166 of actuating lever. However, in this case, the operational sequence is the reverse to the case of the preceding embodiment.

Figure 22:
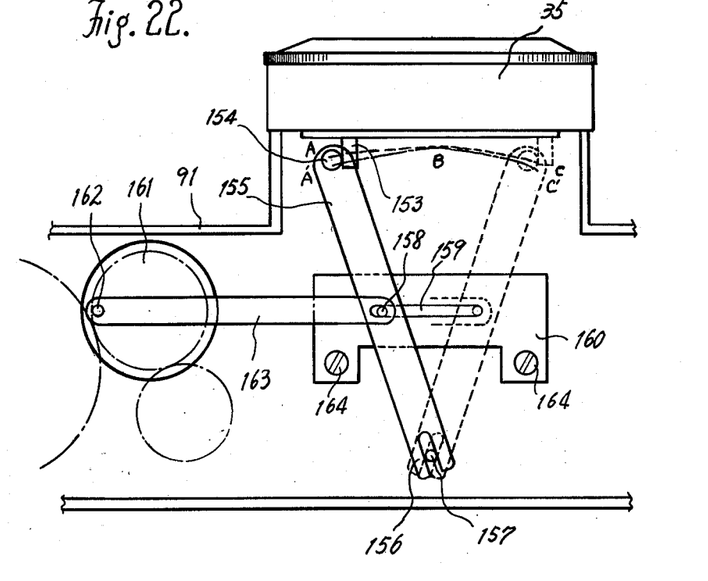
FIG. 22 is a plan illustrating the shutter charging mechanism for the present camera.

FIG. 22 shows by way of example the shutter charge mechanism to be contracted in the monocular camera according to this invention. The pin 154 connected to pin 153 for charging shutter 35 secured to camera body 91 is planted on rocking lever 155, the other end of said lever 155 being formed in forked portion 156, which holds therebetween a pin 157 planted on the side of camera body. Pin 158 provided on one portion of said lever is inserted in guide groove 159 on the side of camera body. Guide groove 159 is movably secured to body 91 by set screws 164 inserted in seating plate 160. Guide groove 159 may directly be inserted in said camera body. And among the gear series for film-reeling, pin 162 is planted on gear 161 which rotates once for reeling one unit length of film, said pins 162 and 158 being connected with connecting rod 163.

Now, when film-reeling lever 95 (see FIGS. 18 and 19) is operated, gear 161, one of the reeling gear series, rotates one rotation to feed one unit length of film. Therefore, if the starting position is set beforehand near the left dead point, pin 162 advances to the right dead point in the progress of film-reeling, when rocking lever 155 rotates clockwise about pin 157 through connecting rod 163, and reaches to the broken line position. The loci A, B, C of movement for pin 154 are curves somewhat flatter than simple circles A', B, C', depending on the shape of guide groove for introducing pin 158. In this embodiment, the guide groove 159 is chosen as a straight line groove for the sake of simplicity. This may be in arcuate form if necessary, which enables the locus for pin 154 to be made a straight line. With respect to the rocking center of rocking lever 155, as the distance of the center to all points in guide groove 159 is not constant, the difference can automatically be controlled by the sliding of forked portion 156 toward pin 157.

Thereupon, pin 154 pushes on charging pin 153 of shutter 35 by the revolution to the right of lever 155, to advance same to the right to complete shutter charging. Furthermore, lever 155 is rotated counterclockwise this time by connecting rod 163 through rotation of gear 161 to return to the original position. By pushing a shutter button, the exposure is performed as in ordinary method and pin 153 for charging is returned from the broken line position on the right said to the original position on the left side. The continuous striking point between the connecting rod 163 and lever 155 is not limited to the location of the pin 158 but a different pin may be planted on another place. When a mere circular hole fulcrum inserted in pin 157 is used in lieu of forked portion 156 of lever 155, pin 154 describes a circular arc locus A', B, C'. Consequently the latter locus is of a higher curvature as compared with the locus A, B, C of the present embodiment, and the height of the arc is larger than that of the former. Pin 153 must be longer.

Furthermore, as shown in the modification of said embodiment and as shown in FIG. 3, an operation-enlarging lever 167 is provided in place of lever 155, one end of said lever is rotatably pivoted to an appropriately secured spindle 168, the other end of said lever being protruded from camera body 91 and a projection 139 may be provided on the upper end. In this case in the central portion of said operation-enlarging lever 167, sliding groove 169 and pin 170 are arranged appropriately for similar purposes as in the preceding embodiment.

What we claim is:

1. In a monocular reflex camera, the combination comprising a shutter, operating means for said shutter, a film reeling mechanism for carrying a roll of film, an exposure meter having a photoelectric cell producing an electric current in accordance with the brightness of an object to be photographed, an indicating needle on said meter displaced in response to current variations, a movable film blind having an area of varying transparence for adjusting film sensitivity to correspond to the amount of light received by the photoelectric cell, a pivoted actuating member operatively disposed between said shutter operating means and said indicating needle, said actuating member having a stepped surface on one end engaging said indicating needle and a slotted groove on its opposite end receiving said shutter operating means, said shutter operating means causing pivotal movement of said actuating member when said shutter is actuated whereby said stepped surface is moved into engagement with said indicating needle which stops such pivotal movement, said shutter operating means sliding in said slotted groove when said shutter is released, and stop means in said slotted groove whereby said shutter operating means is stopped during its releasing movement and thus automatically adjust said shutter to an aperture radius corresponding to the indicating needle of the exposure meter.

2. The combination as recited in claim 1 wherein said slotted groove has a smooth guiding surface on one edge and a series of steps on an opposite edge.

3. The combination as recited in claim 2 wherein a hand operating ring is rotatably secured to said shutter, and a manual knob is disposed on said ring for rotating the same.

4. The combination as recited in claim 1 wherein the film-reeling mechanism drives a sprocket wheel by means of a gear train and wherein a reeling lever is rotatably secured in the camera, a spring loaded gear is carried by said reeling lever, and a second gear meshing with said spring loaded gear is mounted on a transmission spindle.

5. The combination as recited in claim 1 wherein the film reeling mechanism includes a gear and a crank pin thereon making one revolution for reeling one unit length of film and means connecting said crank pin to said shutter whereby charging actuation of said shutter covers the entire step of reeling one unit length of film.

6. The combination as recited in claim 5 wherein said shutter is provided with a charging pin, an interlocking bar has one end operatively engaging said charging pin and an opposite end being slidably and rotatably connected to a fixed pin.

References Cited in the file of this patent

UNITED STATES PATENTS

| | | |
|---|---|---|
| Re. 21,034 | Karg | Mar. 21, 1939 |
| | (Original No. 2,061,909) | |
| 2,297,428 | Nuchterlein | Sept. 29, 1942 |
| 2,387,466 | Rath | Oct. 23, 1945 |
| 2,918,854 | Malek | Dec. 29, 1959 |